Jan. 12, 1937.                J. R. HORNADAY                2,067,638
                           REFRIGERATING APPARATUS
                            Filed Feb. 16, 1935            2 Sheets-Sheet 1

INVENTOR.
JAMES R. HORNADAY
BY
ATTORNEYS

Jan. 12, 1937.    J. R. HORNADAY    2,067,638
REFRIGERATING APPARATUS
Filed Feb. 16, 1935    2 Sheets-Sheet 2

INVENTOR.
JAMES R. HORNADAY
BY
ATTORNEYS

Patented Jan. 12, 1937

2,067,638

UNITED STATES PATENT OFFICE 2,067,638

REFRIGERATING APPARATUS

James R. Hornaday, Dayton, Ohio, assignor to General Motors Corporation, Dayton, Ohio, a corporation of Delaware Application February 16, 1935, Serial No. 6,798

8 Claims. (Cl. 62—1)

This invention relates to refrigeration and more particularly to refrigerating apparatus of the compressor-condenser-expander type. Heretofore, in the use of refrigerating apparatus, particularly with units of large capacity wherein large amounts of noxious refrigerant are contained within a system, a problem has arisen due to the possibility of escape of the refrigerant in dangerous amounts contained within the system. This is particularly true in installations for air conditioning wherein the refrigerant evaporating element is of the direct expansion type and thus introduces the possibility of refrigerant leaking directly into the air stream which is being conditioned. While the presence of a fairly rapid leak will soon become apparent due to early failure of the system to operate properly, a relatively small leak is more difficult to detect. With certain refrigerants, continued exposure to the refrigerant in fairly mild dilutions is dangerous. The existence of this problem is reflected in the rapidly increasing number of regulations imposed by local authorities upon the installation and operation of refrigerating apparatus.

It is an object of the present invention to provide a refrigerating system having an indicator or alarm which will automatically indicate the loss of a predetermined quantity of refrigerant from the system in order to warn an attendant of the existence of a leak no matter how small.

It is a further object of the invention to so construct the indicating apparatus that its operability may be tested with facility at any time.

Further objects and advantages of the present invention will be apparent from the following description, reference being had to the accompanying drawings, wherein a preferred form of the present invention is clearly shown.

Figure 1:
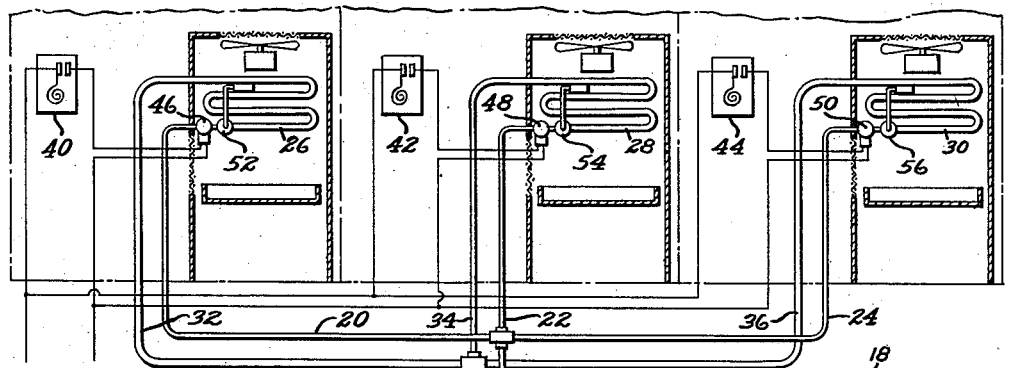
Fig. 1 is a diagrammatic view of a refrigerating system embodying the present invention.

Referring now to Fig. 1, the refrigerating apparatus illustrated comprises a compressor 10, driven by a motor 12 for delivering compressed gaseous refrigerant to a condenser 14. Refrigerant liquefied in the condenser 14 is stored in a receptacle or receiver 16 whence it is delivered by conduits 18, 20, 22 and 24 to a plurality of evaporators 26, 28 and 30. Refrigerant expanded in the evaporators 26, 28 and 30 is withdrawn through suction conduits 32, 34, 36 and 38 into the compressor 10 for recompression. Suitable individual thermostatic controls are supplied for the evaporators 26 comprising thermostats 40, 42 and 44 controlling electrically actuated valves 46, 48 and 50, as well as individual thermostatically controlled expansion valves 52, 54 and 56. The operation of the motor is controlled by a low pressure control switch 58 responsive to the pressure in the suction conduits 38. The apparatus thus far described illustrates a typical air conditioning installation, and is representative of but one of the many types of refrigerating apparatus with which the present invention may be used.

Figure 6:
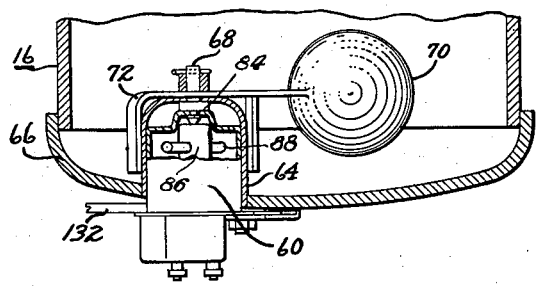
Fig. 6 is a fragmentary cross section of a refrigerant receptacle with which a portion of the alarm mechanism is associated.

In order to indicate the loss of a predetermined quantity of refrigerant from the system, a liquid level responsive circuit controller 60 is provided at some point in the system where a body of liquid refrigerant is stored. Preferably, this is installed in the receiver 16. The circuit controller 60 is connected in circuit with an indicator 62 which may take the form of a lamp or other alarm device. The construction of the liquid level responsive switch 60 is shown in Figs. 2 through 6. Referring to Fig. 6, it will be seen that the receiver 16 is provided with a cup-shaped depression 64 formed in one end thereof in which is essentially a hermetically sealed continuation of the end wall 66 of the receiver 16. A fixed stud 68 mounted on the end of the cup 64 inside the receiver 16 carries for free pivotal movement thereon a float 70. The float 70 carries rigidly connected therewith a U-shaped member 72 of magnetic material which is adapted to loosely embrace the cup 64. The cup 64 is preferably made of non-magnetic material, for example, brass. In the cup 64 is removably positioned a circuit controller 60 comprising a cylindrical shell 76 of non-magnetic material which is closed at its inner end by an end plate 78. A U-shaped bracket 80 is secured to the end plate 78 and carries centrally of the shell 76 an adjustable pivot 82. A fixed pivot 84 is secured to the central portion of the end plate 78. Between the pivots 82 and 84 there is mounted a movable member comprising a hub 86 and a transverse bar 88 of magnetic material. Either the bar 88 or the U-shaped member 72 may be permanently magnetized. The hub 86 also carries an arm 90 upon which is mounted at one end a stud 92 forming a movable contact member. The arm 90 at its opposite end is formed into an indicating pointer 94. A flexible conductor 96 is connected to the bracket 80 and to the stud 92 to insure continuity of the electrical circuit. The bracket 80 also carries by means of supports 98 an insulated plate 100. The plate 100 in turn carries a fixed contact 102 which is positioned in the path of movement of the stud 92. The fixed contact 102 may be formed from one end of a rigid wire 104 which is clamped to the plate 100 by a screw 106, the opposite end of the wire 104 terminating in a terminal 108. The base 110 of the cylindrical shell 76 is formed with an arcuate opening 112 through which the pointer 94 may be viewed. A transparent sheet 113 closes the opening 112. An end plate 114 is mounted adjacent the base 110 and has an arcuate opening registering with the opening 112 in the base 110. A second opening is provided in the base 110 and the plate 114 to receive an insulating bushing 116 through which the terminal 108 extends. The assembly comprising the end plate 78, the bracket 80, the plate 100 and their associated parts is secured in the shell 76 and the shell 76 is in turn secured to the plate 114 by bolts 118 and posts 120, springs 121 serving to retain the transparent sheet 113 adjacent the base 110. Posts 120 also carry a cover plate 122 by means of nuts 124. The cover plate 122 is formed with a pair of openings 126 through which the circuit wires may be led and acts to conceal and protect the terminal 108 and a grounded terminal (not shown). The plate 114 is formed at its lower end with an open ended slot 128 of predetermined width. A bolt 130 is secured to a mounting bracket 132 in a manner to ride in one position in the slot 128. A nut 134 and an angularly formed plate 136 may be utilized to clamp the plate 114 in position with respect to the bracket 132.

In operation of the device, the float 70 moves in response to changes in the liquid refrigerant level within the receiver 16 and carries with it the U-shaped magnetic member 72. The cross bar 88 is caused to follow the movements of the float 70 by magnetic attraction and thus move the pointer 94 and the movable contact 92 in response to changes in the liquid level. The width of the slot 128 is made such with relation to the width of the bolt 130 and to the capacity of the receiver 16 that the total possible angular movement of the plate 114 and the circuit controller 60 when nut 134 is loosened corresponds to the angular movement of the float 70 which would be induced by a change in the refrigerant level representing the loss or addition of a predetermined quantity of refrigerant. The slot 128 may thus be formed in accord with any local regulations with which it may be desired to comply.

Figure 7:
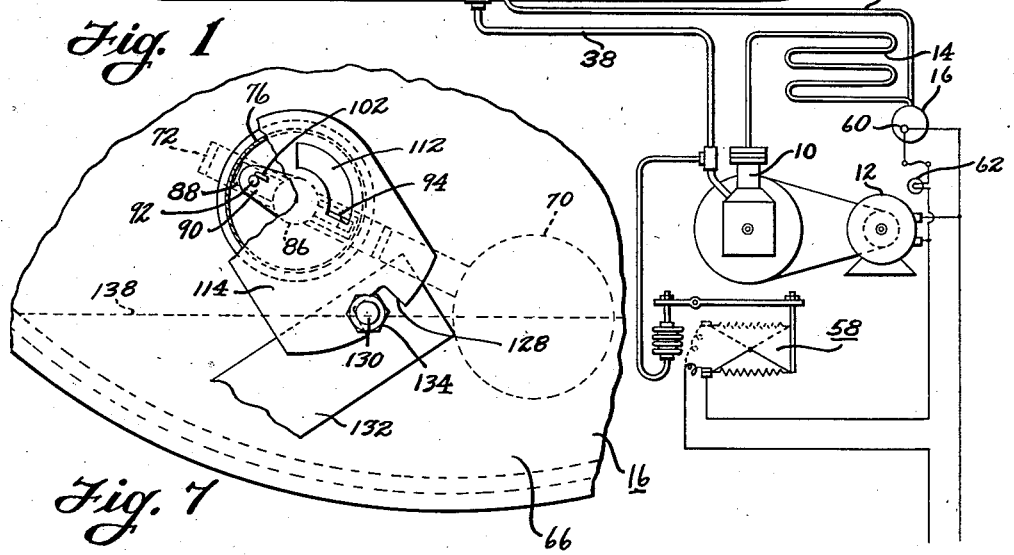
Fig. 7 is a fragmentary end view of a receptacle showing the alarm mechanism in one position.
Figure 8:
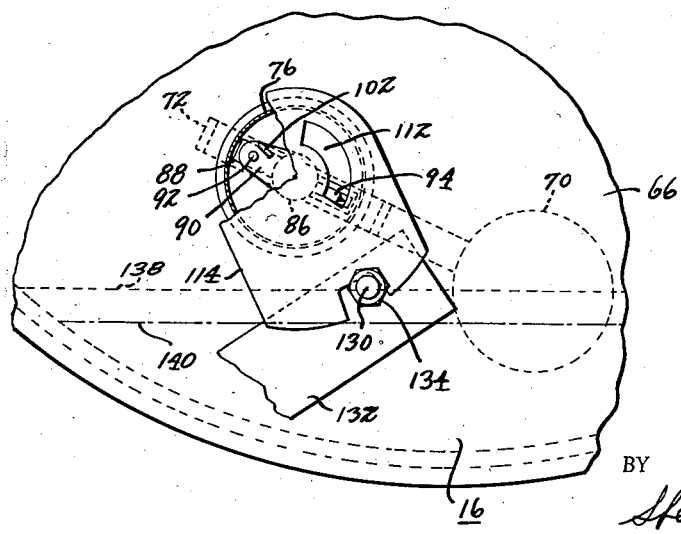
Fig. 8 is a view corresponding to Fig. 7 showing the alarm mechanism in another position.
Figure 2:
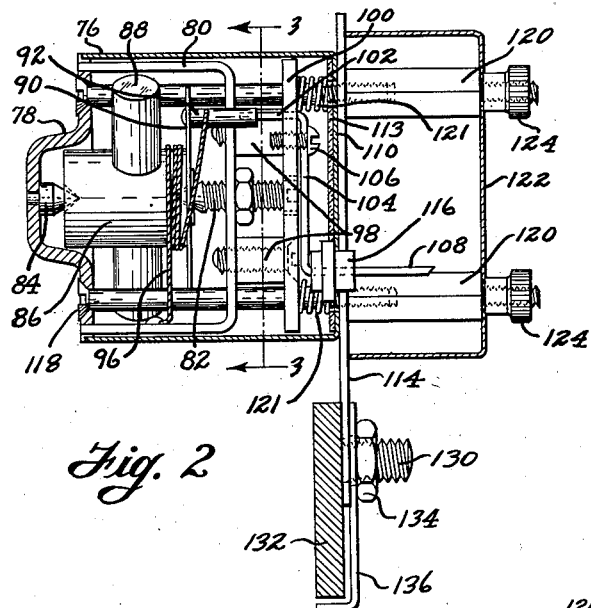
Fig. 2 is a cross section on line 2—2 of Fig. 3 of a portion of the alarm mechanism.
Figure 3:
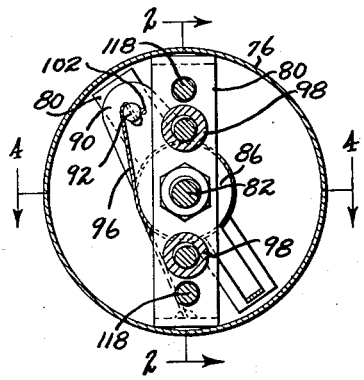
Fig. 3 is a cross section on line 3—3 of Fig. 2.
Figure 4:
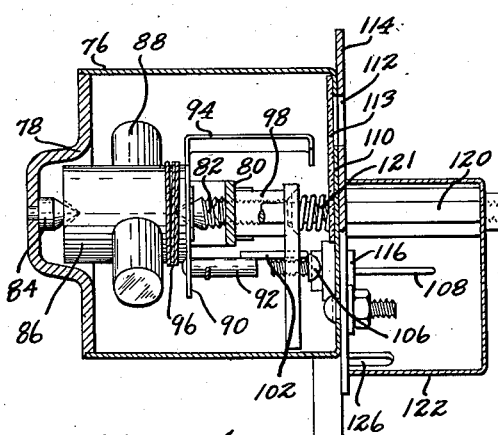
Fig. 4 is a cross section on line 4—4 of Fig. 3.
Figure 5:
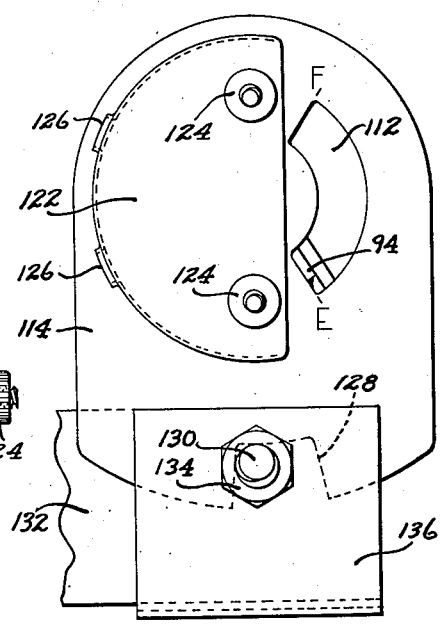
Fig. 5 is a front view of a portion of the alarm mechanism.

When the apparatus is installed, the system is charged with sufficient refrigerant to bring the float to the position indicated in Fig. 8. The level of the refrigerant when the apparatus is fully charged is indicated by the line 138. The line 140 indicates the level which the liquid refrigerant takes when the predetermined quantity, for example, 10 pounds, of refrigerant has been lost from the system. The positions of the parts in Fig. 8 represent the normal positions assumed with the level at the line 138. Thus, it will be seen that the movable contact 92 is spaced from the fixed contact 102 and that so long as the refrigerant level is above the line 140, the circuit to the indicator 62 will be open. Upon the loss of the predetermined quantity of refrigerant from the system, the movable contact 92 will engage the fixed contact 102 and close the circuit to the indicator 102, thus warning an attendant of a leak. Were the position of the circuit controller 60 permanently fixed in relation to the receiver 16, it would be impossible to determine whether a new installation were properly charged and whether the alarm was in operative condition. In other words, it might be possible for a workman to install such an apparatus with the appearance of compliance with the regulations without actual compliance. Thus, with a circuit controller having a fixed position, the apparatus could be charged to a level considerably above the line 138 and the alarm would not operate until the loss of a much greater quantity of refrigerant than the required maximum had taken place. In order to permit an inspector to readily determine whether the alarm apparatus will operate upon a loss of refrigerant within the required maximum, the present apparatus permits the nut 134 to be loosened and the circuit controller 60 to be rotated counter-clockwise to the degree permitted by the width of the slot 128. Inasmuch as this corresponds to the predetermined maximum permissible loss of refrigerant, such a movement should, if the system is properly charged and the alarm apparatus otherwise in operative condition, bring the fixed contact 102 into engagement with the movable contact 92 as illustrated in Fig. 7. If the apparatus is overcharged, the level in the receiver 116 will be above the line 138 and the movable contact 92 will, therefore, be lower than the lowest position to which it is possible to bring the fixed contact 102. Thus, if upon counter-clockwise rotation of the circuit controller 60 to the full extent, the indicator 62 does not operate, it becomes apparent that the alarm apparatus will not function upon the loss of a predetermined maximum amount of refrigerant from the system. Upon this test being made, the circuit controller 60 is returned to the position of Fig. 8 and the bolt 134 is tightened. This test may be made at any time and thus provides a reliable means for determining whether or not the alarm mechanism is properly conditioned for its desired operation.

While the form of embodiment of the present invention as herein disclosed constitutes a preferred form, it is to be understood that other forms might be adopted, all coming within the scope of the claims which follow.

What is claimed is as follows:

1. A refrigerating system including a receptacle for liquid refrigerant and means for indicating a predetermined loss of refrigerant from said system comprising a member movable in respect to changes in liquid level in said receptacle, a normally stationary member, and means responsive to relative movement between said members for indicating a predetermined loss of refrigerant, one of said members being adjustable to an abnormal position to simulate a change in liquid level for test whereby it may be moved a predetermined distance while the liquid level remains stationary to indicate whether the system is charged properly to assure a correct indication when said one member is in normal position.

2. A refrigerating system including a receptacle for liquid refrigerant and means for indicating a predetermined loss of refrigerant from said system comprising a member movable in respect to changes in liquid level in said receptacle, a normally stationary member, and means responsive to relative movement between said members for indicating a predetermined loss of refrigerant, one of said members being adjustable to an abnormal position to simulate a change in liquid level for test whereby it may be moved a predetermined distance while the liquid level remains stationary to indicate whether the system is charged properly to assure a correct indication when said one member is in normal position, and means for limiting the adjustment of said one member.

3. In a refrigerating apparatus comprising a compressor, condenser and expander in closed circuit relation, the combination of a sealed liquid refrigerant receiver in said circuit and formed of a plurality of metallic walls including a wall portion of non-magnetic material, a float in said receiver, means for mounting said float to partake of movement corresponding to changes in the liquid level in said receiver, a member of magnetic material mounted to move with the float and located inside said receiver, another member movably mounted outside said receiver to follow the movement of said first member and formed of magnetic material, and a circuit controlling device controlled by said second member, at least one of said members being permanently magnetized.

4. In a refrigerating apparatus comprising a compressor, condenser and expander in closed circuit relation, the combination of a sealed liquid refrigerant receiver in said circuit and formed of a plurality of metallic walls, means forming a cup-shaped wall portion of non-magnetic material, a float in said receiver, means for mounting said float to partake of pivotal movement corresponding to changes in the liquid level in said receiver, a member of magnetic material mounted to move with the float and located inside said receiver, another member movably mounted outside said receiver to follow the movement of said first member and formed of magnetic material, and a circuit controlling device controlled by said second member, at least one of said members being permanently magnetized.

5. A refrigerating apparatus comprising in combination a compressor, a condenser and an evaporator, a receptacle for condensed refrigerant at the outlet of said condenser, and means for indicating a predetermined loss of refrigerant from said system comprising a member movable in respect to changes in liquid level in said receptacle, a normally stationary member, and means responsive to relative movement between said members for indicating a predetermined loss of refrigerant, one of said members being adjustable to an abnormal position to simulate a change in liquid level for test whereby it may be moved a predetermined distance while the liquid level remains stationary to indicate whether the system is charged properly to assure a correct indication when said one member is in normal position.

6. A refrigerating apparatus comprising in combination a compressor, a condenser and an evaporator, a receptacle for condensed refrigerant at the outlet of said condenser, and means for indicating a predetermined loss of refrigerant from said system comprising a member movable in respect to changes in liquid level in said receptacle, a normally stationary member, and means responsive to relative movement between said members for indicating a predetermined loss of refrigerant, one of said members being adjustable to an abnormal position to simulate a change in liquid level for test whereby it may be moved a predetermined distance while the liquid level remains stationary to indicate whether the system is charged properly to assure a correct indication when said one member is in normal position, and means for limiting the adjustment of said one member.

7. Refrigerating apparatus including liquefying and evaporating means arranged in a closed refrigerant circuit, said closed circuit being provided with a liquid refrigerant accumulator having a wall portion of non-magnetic material, a float in said accumulator, means for mounting said float to partake of movement corresponding to changes in the liquid level in said receiver, a member of magnetic material mounted to move with said float and located within said accumulator adjacent said non-metallic wall portion, a second member of magnetic material movably mounted upon the outside of said accumulator to follow the movement of said first mentioned member directly upon the opposite side of said non-metallic wall portion from said first mentioned member, one of said members being magnetized, and a control means controlled by said second member.

8. Refrigerating apparatus including liquefying and evaporating means arranged in a closed refrigerant circuit, said closed circuit being provided with a liquid refrigerant accumulator, means operative upon predetermined loss of refrigerant from said system comprising a member movable in respect to changes in liquid level in said accumulator, a normally stationary member, a device responsive to a predetermined relative movement of said members, external adjusting means for one of said members for moving at least one of said members relatively to the liquid level in said accumulator to simulate a change of liquid level for testing the operativeness of the first mentioned member and said device.

JAMES R. HORNADAY.